United States Patent [19]

Doyle

[11] Patent Number: 5,895,347
[45] Date of Patent: Apr. 20, 1999

[54] CHEMICALLY STABILIZED ORGANIC EMULSIONS

[75] Inventor: Michael P. Doyle, Phoenix, Ariz.

[73] Assignee: Vinzoyl Technical Services, L.L.C., Paradise Valley, Ariz.

[21] Appl. No.: 08/819,594

[22] Filed: Mar. 17, 1997

[51] Int. Cl.⁶ .............................. B01J 13/00; C08L 95/00; C09D 195/00
[52] U.S. Cl. .............................. 516/43; 106/277; 106/278; 405/264; 405/270; 516/51; 516/928; 588/256; 588/901
[58] Field of Search ..................... 252/312, 314; 106/123.11, 277

[56] References Cited

U.S. PATENT DOCUMENTS

| | | | |
|---|---|---|---|
| 2,269,529 | 1/1942 | Goldsmith | 252/312 X |
| 2,359,503 | 10/1944 | Alsmark | 252/312 X |
| 3,404,991 | 10/1968 | Taylor et al. | 252/312 X |
| 3,867,162 | 2/1975 | Elste, Jr. | 106/277 |
| 4,212,759 | 7/1980 | Young et al. | 252/312 X |
| 4,437,896 | 3/1984 | Partanen | 106/273 R |
| 4,595,512 | 6/1986 | Tellier et al. | 252/312 X |
| 4,822,425 | 4/1989 | Burch | 106/273.1 |

*Primary Examiner*—Richard D. Lovering
*Attorney, Agent, or Firm*—Vinson & Elkins, L.L.P.

[57] ABSTRACT

Methods are disclosed for preparation of chemically-stabilized emulsions of tall oil in water. Temperature and pH are controlled during preparation of the emulsions so as to prevent saponification and neutralization of acids in the tall oil component. The final emulsions have pHs in the range of from about 3.0 to 5.0 and remain phase stable for extended periods of time. Methods are disclosed for using the emulsions for soil treatment to improve soil stabilization and load bearing capacity for roadbed use, for treatment of reclaimed asphalt pavement for reuse as a stabilized base course for roadway construction and for remediation of heavy metal contaminated soil.

19 Claims, No Drawings

CHEMICALLY STABILIZED ORGANIC EMULSIONS

FIELD OF THE INVENTION

This invention relates to organic emulsions having water as the continuous phase of the type commonly used for soil stabilization. More particularly, this invention relates to water phase emulsions comprising tall oils, chemically stabilized with a blend of acid and an emulsifier. The pH of the water phase and the processing temperature are carefully controlled to prevent acid neutralization and/or saponification during emulsification and to control the droplet size of the dispersed phase so as to prevent phase inversion. The emulsion can be used for the treatment of soil to increase load bearing capacity and reduce dust and for treatment of reclaimed asphalt pavement (RAP) to produce a product suitable for use as a cold recycled asphalt pavement. The emulsions are also useful for remediation of soil contaminated with heavy metals, such as lead.

BACKGROUND OF THE INVENTION

It is well known that emulsions of tall oil and combinations of tall oil products with petroleum residues and/or natural asphaltites can be prepared. A wide variety of methods have been used for this purpose and numerous methods are known to the art.

For example, emulsions prepared from blends of tall oil and/or tall oil pitch and naturally occurring or man made gilsonite are disclosed in U.S. Pat. No. 4,437,896, issued Mar. 20, 1984 to John F. Partanen. Additionally, U.S. Pat. No. 4,822,425 issued Apr. 18, 1989 to Richard M. Burch, discloses an emulsion comprising tall oil pitch, added rosin, an emulsifying agent and water. In both the Partanen and Burch patents, the pH and temperatures are not controlled during manufacture to prevent saponification or degradation of the acids or emulsion phase inversion from occurring.

Although various combinations of emulsions comprising tall oil are known to the art, there still exists a need in the industry for improved emulsions from tall oil, emulsified substantially free of other organic components. In part this is due to changes in the paving industries requiring more stringent performance criteria, as well as to changing environmental requirements and changes in the quality of the available tall oil products being supplied to the industry. Many existing methods for preparing emulsions of tall oil products cannot meet the new demands of the paving industry.

The present invention is characterized by the fact that the pH and temperatures during emulsion preparation are controlled to prevent saponification and neutralization of the fatty acids, resin acids and esters naturally occurring in tall oil products from occurring. Further, the emulsion is unique in that an emulsion is prepared without the need to add natural asphaltite or rosin to harden the end system or aid in emulsion stability. Emulsions prepared in accordance with the current invention can use standard refinery streams of tall oil products, without the need to adjust the streams with additional fatty acids or resin acids. The emulsions prepared in accordance with the current invention do not saponify or neutralize the acids or esters thereof contained in the tall oil. Emulsions prepared in accordance with the current invention thus are highly stable over extended periods of storage. The advantages of preserving the fatty acids and esters of the tall oil from saponification or neutralization are that the emulsions remain better able to meet the performance requirements of the paving industry, as well as expanding their use to other industries.

SUMMARY OF THE INVENTION

It is, accordingly, the primary object of the present invention to provide methods for preparing emulsions of tall oil products in such a way that the fatty acids, resin acids and any associated esters thereof are not saponified or degraded during the process and the emulsions are highly stable (i.e., base droplet size does not increase and phase invert). The emulsions created per the present invention are suitable for use as an additive to soils for suppressing dust and increasing the bearing capacity of the soil. Other uses are as a binder in recycled asphalt pavement and in remediation of heavy metal contaminated soils.

DETAILED DISCLOSURE

As used herein, including the claims, "tall oil" includes man made and naturally occurring tall oil, tall oil pitch, tall oil blends and similar tall oil products. Tall oil is the liquid resinous material obtained in the digestion of wood pulp from paper manufacture. Commercial tall oils comprises a complex of fatty acids, resin acids, sterols, higher alcohols, waxes and hydrocarbons. The acid components also may be present as the esters thereof. "Emulsions" as used herein refers to chemically stabilized emulsions with water as the continuous phase and tall oil as the dispersed phase. "Emulsifiers" refer to chemicals which reduce the surface tension between water and a liquid which normally is not water soluble or miscible, such as tall oil. All percentages are weight percentages by total weight, unless otherwise stated.

The acids typically found in tall oil are highly acidic. Saponification of these acids typically occurs at pH levels above 6.5 to 7.0 and temperatures above 72.0° C. (162° F.). Even at temperatures below 72.0° C., but pH levels above 6.5 to 7.0, saponification will occur, although more slowly. Accordingly, in order to protect such acids and their associated esters against saponification, it is important to maintain emulsions prepared from tall oil at pH levels well below the 6.5 to 7.0 threshold, and preferably in the range of from about 3.0 to about 5.0. Additionally, for extended shelf life of the emulsions, it is important to control the percentage of dispersed phase in the emulsion. Emulsions in which the dispersed phase exceeds about 55% to 60% typically will phase invert and become unstable, separating into two phases. Accordingly, it is preferred that the finished emulsions prepared in accordance with the present invention have a dispersed phase (tall oil) content not exceeding approximately 50%, with the balance being aqueous continuous phase.

In the preparing emulsions in accordance with the present invention, a strongly acidic aqueous emulsifier solution is prepared, and then blended with tall oil in order to prepare the finished emulsion. A preferred composition for the emulsifier solution is approximately 4% emulsifier, 95.4% water and 0.6% acid. Preferred acids include hydrochloric acid and stearic acid. Preferred emulsifiers are a nonylphenol/ethylene oxide mixture or lignin amine. Other emulsifiers also can be used. It is desired that the emulsifier solution, once prepared, be strongly acidic, in the range of about pH 1.0. Accordingly, the proportion of water and acid in the solution may be adjusted as needed in order to obtain an emulsifier solution in this strongly acidic range.

In preparing such emulsifier solutions, water (of quality suitable for emulsion manufacture) is heated to about 48° C., half of the acid is added to the hot water, all of the emulsifier is added and thoroughly mixed and the remaining acid is added. The pH of the solution should be about 1.0, if not, adjust to about 1.0 with additional acid.

Separately, the tall oil (preferably tall oil pitch) is heated to about 126° C. Polymers, or other modifiers, if utilized, preferably are added to the tall oil prior to or during the heating step.

The heated emulsifier solution and tall oil then are blended in a homogenizer or a colloid mill to form the finished emulsion. The blending rate is selected to prevent air entertainment or foaming from occurring. The ratio of the emulsifier solution to tall oil preferably is such that the emulsion is about 50% tall oil and 50% emulsifier solution; however, acceptable ranges are from about 40% to 60% tall oil, with the balance emulsifier solution. The finished emulsion preferably has a pH of from about 3.0 to about 5.0. If not, the acid content of the emulsifier solution can be adjusted to achieve the desired final pH.

The finished emulsion typically has a composition substantially as follows:

| Components | Percentage |
| --- | --- |
| water | 47.70 |
| acid | 00.30 |
| emulsifier | 02.00 |
| tall oil | 50.00 |
| Total | 100.00 |

Although the tall oil component in the emulsion preferably is no more than about 50 to 55 weight percent, so as to prevent phase inversion and extend the shelf life of the emulsion, when used, the emulsion may be further diluted with water to a desired application strength, since the more dilute emulsion resulting will be used promptly. Dilution of the finished emulsion with an equal amount of water prior to application would be typical.

Experimental

A series of emulsions were prepared in accordance with the procedure disclosed above and tested as discussed below. The formulations and some results are presented in Tables 1-A and 1-B:

TABLE 1-A

| Emulsion Number | Tall Oil Source | Tall Oil Modifier | Emulsifier Type | Emulsifier Percentage | Acid Type | Solution pH | Solution Temp. (° C.) | Tall Oil Temp. (° C.) |
| --- | --- | --- | --- | --- | --- | --- | --- | --- |
| 1 | GP | None | Nonylphenol | 1.00 | None | 7 | 48° | 126° |
| 2 | GP | None | Nonylphenol | 1.50 | None | 7 | 48° | 126° |
| 3 | GP | None | Nonylphenol | 2.00 | None | 7 | 48° | 126° |
| 4 | GP | None | Nonylphenol | 1.00 | HCl | 4.00 | 48° | 126° |
| 5 | GP | None | Nonylphenol | 1.50 | HCl | 3.00 | 48° | 126° |
| 6 | GP | None | Nonylphenol | 1.50 | HCl | 2.00 | 48° | 126° |
| 7 | GP | None | Nonylphenol | 1.50 | HCl | 1.00 | 48° | 126° |
| 8 | GP | None | Nonylphenol | 1.50 | HCl | 1.00 | 48° | 126° |
| 9 | GP | None | Nonylphenol | 1.50 | HCl | 1.00 | 48° | 160° |
| 10 | GP | None | Lignin Amine | 1.50 | HCl | 1.00 | 48° | 126° |
| 11 | Az. Chem. | None | Nonylphenol | 1.50 | HCl | 1.00 | 48° | 126° |
| 12 | Az. Chem. | None | Lignin Amine | 1.50 | HCl | 1.00 | 48° | 126° |
| 13 | GP | None | Nonylphenol | 2.00 | HCl | 1.00 | 48° | 126° |
| 14 | GP | None | Nonylphenol | 1.50 | Stearic Acid | 1.00 | 48° | 126° |
| 15 | GP | Humic Acid | Nonylphenol | 1.50 | HCl | 1.00 | 48° | 160° |
| 16 | GP | X-TOL 543 | Nonylphenol | 1.50 | HCl | 1.00 | 48° | 126° |
| 17 | GP | X-TOL 304 | Nonylphenol | 1.50 | HCl | 1.00 | 48° | 126° |

"GP" is a tall oil pitch supplied by Georgia-Pacific Resins, Inc. and comprising a straight run vacuum tower bottoms stream produced from the refining of crude tall oil obtained from a kraft paper process and marketed under the trademark EXTOL.
"Az. Chem." is a similar tall oil pitch marketed by Arizona Chemical, Panama City, Florida, under the trademark ACINTOL.
"X-TOL 543" is a variation of the XTOL tall oil pitch from Georgia-Pacific Resins, Inc., containing approximately 39.4% resin acids and 51% fatty acids.
"X-TOL 304" is a variation of the XTOL tall oil pitch from Georgia-Pacific Resins, Inc., containing approximately 1.6% resin acids and having an acid number of 194.5.

TABLE 1-B

| Emulsion Number | Tall Oil Percentage | Emulsion Temp. (° C.) | Stability 24 Hour | Stability 5 Day | Stability 60 Day | Miscibility In Water |
| --- | --- | --- | --- | --- | --- | --- |
| 1 | 50 | 71° | Fail | Fail | Fail | Fail |
| 2 | 50 | 71° | Fail | Fail | Fail | Fail |
| 3 | 50 | 71° | Fail | Fail | Fail | Fail |
| 4 | 50 | 71° | Fail | Fail | Fail | Fail |
| 5 | 50 | 71° | Pass | Pass | Fail | Fail |
| 6 | 50 | 71° | Pass | Pass | Fail | Fail |
| 7 | 50 | 71° | Pass | Pass | Pass | Pass |
| 8 | 55 | 71° | Pass | Pass | Fail | Fail |
| 9 | 60 | 71° | Fail | Fail | Fail | Fail |
| 10 | 50 | 71° | Pass | Pass | Pass | Pass |
| 11 | 50 | 71° | Pass | Pass | Pass | Pass |
| 12 | 50 | 71° | Pass | Pass | Pass | Pass |
| 13 | 50 | 71° | Pass | Pass | Pass | Pass |
| 14 | 50 | 71° | Pass | Pass | Pass | Pass |
| 15 | 50 | 71° | Pass | Pass | Pass | Pass |
| 16 | 50 | 71° | Pass | Pass | Pass | Pass |
| 17 | 50 | 71° | Pass | Pass | Pass | Pass |

In Tables 1-A, 1-B, the column "Emulsifier Percentage" and "Tall Oil Percentage" refer to the weight percent of, respectively, the emulsifier and tall oil components in the finished, shelf-stable, emulsions. "Solution Temperature" and "Tall Oil Temperature" refer to the temperatures of the emulsifier solution and tall oil components just prior to mixture, while "Emulsion Temperature" refers to the temperature of the finished emulsion immediately after mixing.

The "Stability" columns for 24 hour, 5 day and 60 day periods refer to whether the finished emulsion remains stable (does not phase invert) when stored at room temperature for the indicated periods of time. "Miscibility in Water" refers to whether the finished emulsion, containing approximately 50% emulsified tall oil, blends satisfactorily on a 1-to-1 basis with additional water to form a more dilute emulsion for application uses.

Tests have demonstrated that the acid values or acid numbers for the finished emulsions are comparable to those of the straight run tall oil used in preparing the emulsions, adjusted for their dilution in the emulsions and for the additional acid added in emulsifier solutions. This confirms that the acid values of the pre-emulsion tall oil are being preserved in the process of preparing the emulsions, rather than being partially saponified or neutralized as an in prior art processes.

Emulsions in accordance with Emulsion No. 7 in Tables 1-A, 1-B, further diluted with additional water prior to use, were used to treat test soil samples in order to demonstrate utility of the emulsion as a soil treatment to increase load bearing capacity and strength of road bed soils. The emulsion was tested with a clayey soil, classified A-7 under the AASHTO soil classification system, which rates soils A-1 to A-7, A-7 being the worst. Soil samples were obtained from a site near the intersection of Warner and Greenfield Roads in Gilbert, Maricopa County, Arizona. The material is a clayey soil. Samples from 25 five-gallon buckets were combined and sieved through a No. 4 sieve to remove any oversize material and to break up clumps, and then thoroughly mixed together. The combined soil material was then split by the quartering method back into the five-gallon buckets for storage. This produced a uniform soil sample used for all of the soil stability tests.

Hydrometer data indicated constituent components of the soil sample as: sand, from about 35% to 39%; silt from about 26% to 33%; and clay, from about 38% to 28%. Maximum density varied from 103 pcf. to 105.5 pcf., and optimum moisture (the water content permitting maximum compaction and density of the soil) from approximately 18.5% to 21%. The liquid limit (the most liquid the soil will hold) was 48, approaching that of high plasticity or "fat" clay, the plasticity index was 30, and the clay is expansive. Clay mineralogy evaluation indicated that the clay is primarily montmorillonite.

Marshall specimens (test plugs about 4 inches in diameter and 2½ inches high) of emulsion-treated soil were prepared generally in accordance with the "Proposed Asphalt Emulsion Cold Mix Design Method" obtained from Akzo Nobel. Soil sample specimens were compacted at total liquids content near the optimum moisture content obtained by ASTM D698, "Test Method for Laboratory Compaction Characteristics of Soil Using Standard Effort," Method A, approximately 20% total liquid by weight of soil. Marshall specimens were treated with an application emulsion produced by mixing the emulsion #7 of Table 1-A, 1-B with an additional quantity of water. The additional water added was varied so as to produce the weight percent tall oil residue (measured on a moisture-free basis) in the substantially dry Marshall specimens shown in Table 2 (ranging from 0.5 weight percent to 4.0 weight percent). Compaction effort consisted of 30 blows per face as indicated in the referenced emulsion design procedure. Higher compactive efforts were found not to be feasible for specimens made with the clay soil.

The emulsion treated Marshall specimens were cured in air at approximately 25° C. overnight for 16 to 18 hours, then oven-cured at 60° C. for 48 hours. Marshall stability tests were performed on 60° C. specimens, and the results and averages are shown in Table 2:

TABLE 2

CLAY SOIL TREATED WITH EMULSION #7
Marshall Stability, Lbs. and Flow, 0.01 IN

| % Residue | Stability | Flow |
|---|---|---|
| 0.5 | 8800 | 20 |
|  | 8800 | 21 |
|  | 8800 Average | 21 Average |
| 1.0 | 5520 | 14 |
|  | 5600 | 14.5 |
|  | 5600 | 15.5 |
|  | Average | 15 Average |
| 1.5 | 6200 | 19 |
|  | 6200 | 21 |
|  | 6200 Average | 20 Average |
| 2.0 | 4600 | 18.5 |
|  | 4325 | 13 |
|  | 4463 Average | 16 Average |
| 3.0 | 4050 | 12.5 |
|  | 4250 | 16 |
|  | 4500 | 13.5 |
|  | 4267 Average | 14 Average |
| 4.0 | 5460 | 21 |
|  | 5400 | 22 |
|  | 5430 Average | 21 Average |

R-Value testing was performed in general accordance with California Test 301, "Method of Test for Determination of the Resistance 'R' Value of Treated and Untreated Bases, Subbases and Basement Soils by the Stabilometer." "R-Values" measure resistance to plastic deformation of the soil under imposed loads. R-Value testing is done on saturated specimens. Therefore, the emulsion treated Marshall specimens first were prepared as discussed above and then air dried for 21 days, after which they were saturated with additional water prior to R-Value testing.

Table 3 tabulates the results. The first column shows the percent residual tall oil (measured on a moisture-free basis) on the dried emulsion-treated Marshall specimens. The second column shows the amount of weight gained by the treated specimens upon water saturation, measured as a percent of the dry Marshall specimen weight. The third column measures the R-Value of the saturated specimens.

TABLE 3

| % Residual Tall Oil | Saturation Weight Increase (%) | R-Value |
|---|---|---|
| 0 | — | 8 (interpolated) |
| 0.5 | 17.3 | 8 |
| 1.0 | 19.4 | 9 |
| 1.5 | 24.7 | 10 |
| 2.0 | 26.2 | 23 |

The results indicate a minimal R-Value increase at 1.5% or less residual tall oil, with a substantial increase to R-Value 23 at 2.0 weight percent. This indicates that the preferred amount of emulsion used for treating road bed soil should be selected to produce a tall oil residue in the treated soil (the portion of the soil actually wetted by the applied emulsion/ water solution) of approximately 2.0 weight percent or greater, based on dry soil weight. The 2.0 weight percent residual tall oil sample was further air dried and tested for R-Value on a dry basis, producing a very high R-Value of 90.

Accordingly, the tests demonstrate that the shelf-stable tall oil emulsions produced in accordance with the present invention are useful as soil stabilizers for road bed construction and produce road bed soils roughly comparable to those which would be produced by a surface application of a thin film of asphalt, tar, etc.

Reclaimed Asphalt Pavement

Emulsions prepared in accordance with the present invention also are useful as binders for reclaimed asphalt pavement to produce a cold recycled asphalt pavement mixture suitable for use in road bed construction. Recycled asphalt pavement, commonly referred to as "RAP," is old asphalt concrete taken up from, or ground off of, existing roadways. Such material, treated with an appropriate binder, produces a cold recycled asphalt pavement mixture for use as a stabilized base course for new road construction and for paving applications. Prior art binders used for such reclaimed asphalt pavement most commonly were aromatic emulsions, which served to soften the RAP and make it stick together when laid down under pressure, as with a steam roller. However, aromatics of all sorts, including aromatic emulsions, increasingly are deemed harmful to the environment and their use in open air applications is being restricted. A substantial market therefore exists for other types of binders for RAP pavements which are substantial free of aromatic petroleum constituents.

The RAP material used in the test reported below had a size distribution, determined in accordance with ASTM C136 and ASTM C117 as follows:

| SIEVE SIZE | ACCUMULATIVE % PASSING |
|---|---|
| 6 | |
| 4 | |
| 3 | |
| 2 | |
| 1½ | |
| 1¼ | 100 |
| 1 | 98 |
| ¾ | 94 |
| ½ | 79 |
| ⅜ | 71 |
| No. 4 | 56 |
| 8 | 46 |
| 10 | 34 |
| 16 | 31 |
| 30 | 22 |
| 40 | 10 |
| 50 | 7 |
| 100 | 5 |
| Finer Than No. 200 | 3.3 |

Sample mixtures of such RAP were admixed with samples of finished emulsion no. 13 of Table 1-A, 1-B above at varying emulsion amounts equal to 2, 3 and 4 weight percent emulsion, based upon the dry weight of RAP. Finished emulsion no. 13 was admixed with sufficient water, prior to blending with the RAP sample, to maintain a constant mixing fluids (mixing water plus emulsion) content of 6 weight percent mixing fluids based upon the dry weight of RAP, for each of the 2, 3 and 4 weight percent emulsion levels tested.

Three sets of Marshall specimens were prepared from the 2, 3 and 4 weight percent emulsion/RAP mixtures and were tested using the Marshall method (ASTM D1559). Fifty compaction blows were applied per Marshall specimen phase at an angle of 75±5°. Following compaction, the specimens were left in their molds and oven cured at 49° C. for 24 hours. They were then extruded, placed on glass plates and again oven cured at 49° C. for additional 24 hours. After final curing, the specimens were cooled to 25° C. and tested for height, density, Marshall stability and flow. Examination of the specimens after the Marshall stability tests indicated that binder distribution and aggregate coating appeared satisfactory for each of the 2, 3 and 4 percentages mixtures. The results of Marshall stability tests on the samples are presented in Table 4 below:

TABLE 4

| SPECIMEN NUMBER | EMULSION CONTENT % | DENSITY (pcf) | SPECIMEN HEIGHT (in) | MARSHALL STABILITY (lbs.) |
|---|---|---|---|---|
| 1 | 2.0 | 117.6 | 2.438 | 4150 |
| 2 | 2.0 | 117.6 | 2.458 | 3920 |
| 3 | 2.0 | 117.6 | 2.480 | 4060 |
| — | Average | 117.6 | — | 4043 |
| 4 | 3.0 | 117.3 | 2.495 | 3050 |
| 5 | 3.0 | 117.8 | 2.476 | 3200 |
| 6 | 3.0 | 117.8 | 2.473 | 3320 |
| — | Average | 117.5 | — | 3190 |
| 7 | 4.0 | 117.8 | 2.490 | 2600 |
| 8 | 4.0 | 118.7 | 2.478 | 2650 |
| 9 | 4.0 | 118.5 | 2.468 | 2650 |
| — | Average | 118.3 | — | 2633 |

In Table 4 the "average" line shows, respectively, for the 2%, 3% and 4% samples tested average density and average Marshall stability, measured in pounds, of the samples tested. The Asphalt Institute specifications for RAP used as cold recycled asphalt specifies 750 lbs. or better Marshall stability for light traffic, 1200 lbs. or better Marshall stability for medium traffic and 1800 lbs. or better Marshall stability for heavy traffic road bed usage of such pavements. Accordingly, the tested stability for emulsion treated RAP samples all produced Marshall stability ratings which meet or exceed those required by the Asphalt Institute for use of such materials in road bed paving. Further, the tests demonstrate that an emulsion content of approximately 2%, based upon dry RAP weight produces the highest Marshall stability rating of those samples tested. Since the emulsion no. 13 is 50% tall oil, 2% emulsion, based on the dry weight of RAP, represents a contribution of approximately 1% tall oil, measured on a water-free basis, to the RAP/emulsion mixture.

Soil Remediation

An additional use of emulsions prepared in accordance with the present invention is for remediation of soil contaminated with heavy metals, especially lead. Capillary and hydraulic flows of water in porous media contaminated by heavy metal species, has resulted in aquifer contamination. Removal of heavy metals from the contaminated soil is energy intensive and time consuming, since the mobility of heavy metal ions such as lead is orders of magnitude slower in soil than in water. Remediation of the soil by chemical treatment which binds the metal contaminants in place, so that they will not leach out of the soil, has the potential for substantial cost savings, while producing significant environmental benefits.

Utility of emulsions in accordance with the present invention for use as soil remediation additives was demonstrated by comparing lead contamination measurements of soils spiked with 1,000 parts per million lead with the same lead contaminated soil treated with 1% of finished emulsion no. 12 of Table 1-A, 1-B above. Four soil samples were tested for total lead, STLC lead and TCLP lead as follows:

TABLE 5

|  | Total Lead | STLC Lead | TCLP Lead |
|---|---|---|---|
| Soil (no lead) | 14 | — | — |
| Soil (with 1,000 ppm lead added) | 660 | 66 | 4.2 |
| Soil (with 1,000 ppm lead added) plus 1% Emulsion No. 12 | 760 | 62 | 2.6 |
| Soil (no lead) plus 1% Emulsion No. 12 | 11 | 0.5 | <0.5 |

In Table 5, total lead was determined by EPA test 6010, STLC lead was determined by EPA test method 6010 and TCLP lead was determined by EPA methods 1311/6010. The STLC lead and TCLP lead are both U.S. Environmental Protection Agency ("EPA") tests which measure lead leached from soil under test conditions, in order to approximate the amount of lead in the soil which is available for leaching into the environment. The 2.5 TCLP lead measured for the lead contaminated soil treated with 1% emulsion no. 12 is sufficiently low that such soil would not require additional remediation for most purposes, while the 4.2 TCLP lead measured for the untreated sample would require remediation. Accordingly, a suitable method for remediating lead contaminated soil for compliance with EPA requirements would comprise removing the contaminated soil, admixing it with 1% or more by weight of an emulsion prepared in accordance with the present invention (representing approximately 0.5 weight percent of tall oil on a moisture free basis) and returning the emulsion treated soil to place or removing it to another site for disposal.

The foregoing disclosure and description of the invention are illustrative only, and various changes may be made in the emulsion components, methods of formulation and application, within the scope of the appended claims, without departing from the spirit of the invention.

What is claimed is:

1. A method of forming an emulsion, said method comprising:

forming a mixture comprising (1) tall oil, (2) water, (3) acid and (4) an emulsifier , said tall oil comprising the major hydrocarbon component of said mixture and said tall oil and water, combined, comprising a majority, by weight, of said mixture; and agitating said mixture so as to produce an emulsion of said tall oil in a continuous aqueous phase, while controlling the pH and temperature of said mixture and said emulsion so as to substantially prevent saponification of said acid and ester components of said tall oil.

2. A method of forming an emulsion, said method comprising:

preparing an emulsifier solution by admixing water, acid and an emulsifier, said emulsifier solution having a pH of about 1.0;

admixing said emulsifier solution with tall oil to produce a mixture having tall oil as its major hydrocarbon-containing component with tall oil and water, combined, comprising a majority, by weight, of said mixture; and agitating said mixture of emulsifier solution and tall oil so as to produced an emulsion of said tall oil in a continuous aqueous phase of said emulsifier solution, while controlling the pH and temperature of said mixture and said emulsion so as to substantially prevent saponification of acid and ester components of said tall oil.

3. The method according to claim 1 or 2 wherein said acid is selected from the group consisting of hydrochloric acid and stearic acid.

4. The method according to claim 2 wherein said emulsifier is selected from the group consisting of (1) a mixture of nonylphenol and ethylene oxide and (2) lignin amine.

5. The method according to claim 1 wherein said water, acid and emulsifier are blended together prior to admixture with said tall oil.

6. The method according to claim 1 or 2 wherein said pH of said mixture and said emulsion are controlled in the range of from about 3.0 to about 5.0.

7. The method according to claim 1 or 2 wherein said mixture and said emulsion are maintained at a temperature of about 71° C. or lower.

8. The method according to claim 1 or 2 wherein said mixture comprises from about 40 to about 60 weight percent tall oil and from about 60 to about 40 weight percent of said water, acid and emulsifier, combined.

9. The method according to claim 1 or 2 wherein said mixture comprises approximately 50 weight percent tall oil and about 50 weight percent, combined, of said water, acid and emulsifier.

10. The method according claim 1 or 2 wherein said mixture and said emulsion are substantially free of fatty acids, resin acids, asphaltite and rosin components not supplied by said tall oil.

11. The method according to claim 1 or 2 wherein said tall oil is tall oil pitch.

12. A method of forming an emulsion, said method comprising:

forming a mixture comprising (1) tall oil, (2) water, (3) acid, and (4) an emulsifier selected from the group consisting of (1) a mixture of nonylphenol and ethylene oxide and (2) lignin amine; and agitating said mixture so as to produce an emulsion of said tall oil in a continuous aqueous phase, while controlling the pH and temperature of said mixture and said emulsion so as to substantially prevent saponification of said acid and ester components of said tall oil.

13. A chemically stabilized organic emulsion comprising:

(1) tall oil; (2) water; (3) acid, and (4) an emulsifier, said emulsion having a pH in the range of about 3.0 to 5.0 having tall oil as its major hydrocarbon-containing component, with said tall oil and water, combined, comprising a majority, by weight, of said emulsion.

14. A chemically stabilized organic emulsion comprising the emulsified admixture of:

(1) an emulsifier solution comprising water, acid and an emulsifier, said emulsifier solution having a pH of about 1.0; and (2) tall oil, said emulsion having a pH of from about 3.0 to about 5.0 and having tall oil as its major hydrocarbon-containing component and with said tall oil and water, combined, comprising a majority, by weight, of said emulsion.

15. The emulsion according to claim 13 or 14 wherein said acid is selected from the group consisting of hydrochloric acid and stearic acid.

16. The emulsion according to claim 13 or 14 wherein said emulsifier is selected from the group consisting of:
   (1) a mixture of nonylphenol and ethylene oxide, and (2) lignin amine.

17. The emulsion according to claim 13 or 14 wherein said emulsion comprises, by weight, approximately 50% tall oil, 48.35% water, 1.5% emulsifier and 0.15% inorganic acid.

18. The emulsion according to claim 13 or 14 wherein said tall oil is tall oil pitch.

19. A chemically stabilized organic emulsion consisting essentially of (1) tall oil; (2) water; (3) acid and (4) an emulsifier selected from the group consisting of (1) a mixture of nonylphenol and ethylene oxide and (2) lignin amine, said emulsion having a pH in the range of from about 3.0 to 5.0.

* * * * *